United States Patent
Harrison et al.

(10) Patent No.: US 8,166,310 B2
(45) Date of Patent: Apr. 24, 2012

(54) METHOD AND APPARATUS FOR PROVIDING TEMPORARY ACCESS TO A NETWORK DEVICE

(75) Inventors: Robert Brian Harrison, San Bruno, CA (US); Lonhyn Jasinskyj, San Bruno, CA (US); Paul J. Clegg, Pacifica, CA (US); Ben Cottrell, Sunnyvale, CA (US)

(73) Assignee: Ironport Systems, Inc., San Bruno, CA (US)

( * ) Notice: Subject to any disclaimer, the term of this patent is extended or adjusted under 35 U.S.C. 154(b) by 1063 days.

(21) Appl. No.: 11/139,376

(22) Filed: May 26, 2005

(65) Prior Publication Data

US 2005/0268345 A1    Dec. 1, 2005

Related U.S. Application Data

(60) Provisional application No. 60/575,658, filed on May 29, 2004.

(51) Int. Cl.
*G06F 21/00* (2006.01)
(52) U.S. Cl. ........................ 713/184; 713/202
(58) Field of Classification Search .................. 713/184, 713/168
See application file for complete search history.

(56) References Cited

U.S. PATENT DOCUMENTS

| | | | | |
|---|---|---|---|---|
| 5,115,508 A | * | 5/1992 | Hatta | 340/5.22 |
| 5,212,729 A | * | 5/1993 | Schafer | 705/55 |
| 5,319,776 A | | 6/1994 | Hile et al. | |
| 5,347,580 A | * | 9/1994 | Molva et al. | 713/159 |
| 5,495,411 A | * | 2/1996 | Ananda | 705/32 |
| 5,537,544 A | * | 7/1996 | Morisawa et al. | 726/19 |
| 5,581,700 A | * | 12/1996 | Witte | 726/19 |
| 5,623,600 A | | 4/1997 | Ji et al. | |
| 5,666,415 A | * | 9/1997 | Kaufman | 713/159 |
| 5,802,178 A | | 9/1998 | Holden et al. | |
| 5,805,810 A | | 9/1998 | Maxwell | |

(Continued)

FOREIGN PATENT DOCUMENTS

GB    2261538    *   5/1993

(Continued)

OTHER PUBLICATIONS

Sobell, Mark G., "A Practical Guide to the Unix System," 3rd ed. Copyright 1995, pp. 20, 25, 27, 491-493.*

(Continued)

*Primary Examiner* — Nabil El-Hady
*Assistant Examiner* — Dant Shaifer Harriman
(74) *Attorney, Agent, or Firm* — Hickman Palermo Truong & Becker LLP (57) ABSTRACT

A method and apparatus for providing access to resources of a network device is provided. A user instructs a network device to generate a user password that is concealed from the user of the network device. The network device generates the user password based on, at least in part, public input provided by the user, and an algorithm which is concealed from the user, but known to a support service provider. The user communicates the public input to the support service provider. The support service provider uses the public input to generate a provider password based on, at least in part, the algorithm. The support service provider may access the network device via a network by providing the provider password to the network device. If the provider password matches the user password generated, then the support service provider is granted access to resources of the network device.

27 Claims, 3 Drawing Sheets

U.S. PATENT DOCUMENTS

| | | | |
|---|---|---|---|
| 5,812,764 A * | 9/1998 | Heinz, Sr. | 726/5 |
| 5,832,208 A | 11/1998 | Chen et al. | |
| 5,889,943 A | 3/1999 | Ji et al. | |
| 5,915,087 A | 6/1999 | Hammond et al. | |
| 5,933,416 A | 8/1999 | Schenkel et al. | |
| 5,958,005 A | 9/1999 | Thorne et al. | |
| 5,968,176 A | 10/1999 | Nesset et al. | |
| 5,983,270 A | 11/1999 | Abraham et al. | |
| 5,983,350 A | 11/1999 | Minear et al. | |
| 5,999,967 A | 12/1999 | Sundsted | |
| 6,003,084 A | 12/1999 | Green et al. | |
| 6,052,709 A | 4/2000 | Paul | |
| 6,072,942 A | 6/2000 | Stockwell et al. | |
| 6,161,130 A | 12/2000 | Horvitz et al. | |
| 6,192,114 B1 | 2/2001 | Council | |
| 6,195,587 B1 | 2/2001 | Hruska et al. | |
| 6,212,558 B1 | 4/2001 | Antur et al. | |
| 6,226,670 B1 | 5/2001 | Ueno et al. | |
| 6,266,692 B1 | 7/2001 | Greenstein | |
| 6,289,105 B1 | 9/2001 | Murota | |
| 6,330,590 B1 | 12/2001 | Cotton | |
| 6,341,309 B1 | 1/2002 | Vaid et al. | |
| 6,393,568 B1 | 5/2002 | Ranger et al. | |
| 6,408,336 B1 | 6/2002 | Schneider et al. | |
| 6,421,709 B1 | 7/2002 | McCormick et al. | |
| 6,434,600 B2 | 8/2002 | Waite et al. | |
| 6,460,050 B1 | 10/2002 | Pace et al. | |
| 6,484,261 B1 | 11/2002 | Wiegel | |
| 6,502,131 B1 | 12/2002 | Vaid et al. | |
| 6,507,866 B1 | 1/2003 | Barchi | |
| 6,539,430 B1 | 3/2003 | Humes | |
| 6,587,550 B2 | 7/2003 | Council et al. | |
| 6,591,291 B1 | 7/2003 | Gabber et al. | |
| 6,609,196 B1 | 8/2003 | Dickinson, III et al. | |
| 6,650,890 B1 | 11/2003 | Irlam et al. | |
| 6,654,787 B1 | 11/2003 | Aronson et al. | |
| 6,665,800 B1 * | 12/2003 | Jaber | 726/19 |
| 6,675,162 B1 | 1/2004 | Russell-Falla et al. | |
| 7,181,498 B2 | 2/2007 | Zhu et al. | |
| 7,272,853 B2 | 9/2007 | Goodman et al. | |
| 7,409,708 B2 | 8/2008 | Goodman et al. | |
| 2001/0005885 A1 | 6/2001 | Elgamal et al. | |
| 2002/0004908 A1 | 1/2002 | Galea | |
| 2002/0016824 A1 | 2/2002 | Leeds | |
| 2002/0133469 A1 | 9/2002 | Patton | |
| 2002/0184315 A1 | 12/2002 | Earnest | |
| 2003/0050988 A1 | 3/2003 | Kucherawy | |
| 2003/0110224 A1 | 6/2003 | Cazier et al. | |
| 2003/0131266 A1 | 7/2003 | Best et al. | |
| 2003/0149726 A1 | 8/2003 | Spear | |
| 2003/0158905 A1 | 8/2003 | Petry et al. | |
| 2003/0167402 A1 | 9/2003 | Stolfo et al. | |
| 2003/0172291 A1 | 9/2003 | Judge et al. | |
| 2004/0019651 A1 | 1/2004 | Andakar | |
| 2004/0025026 A1 | 2/2004 | Karp et al. | |
| 2004/0054742 A1 | 3/2004 | Gruper et al. | |
| 2004/0058673 A1 | 3/2004 | Irlam et al. | |
| 2004/0064371 A1 | 4/2004 | Crapo | |
| 2004/0073617 A1 | 4/2004 | Milliken et al. | |
| 2004/0083230 A1 | 4/2004 | Caughey | |
| 2004/0093384 A1 | 5/2004 | Shipp | |
| 2004/0117648 A1 | 6/2004 | Kissel | |
| 2005/0064850 A1 | 3/2005 | Irlam et al. | |
| 2005/0246440 A1 | 11/2005 | Yu | |
| 2005/0265319 A1 | 12/2005 | Clegg et al. | |

FOREIGN PATENT DOCUMENTS

| | | | |
|---|---|---|---|
| WO | WO 01/67330 A1 | 9/2001 | |
| WO | WO 02/25464 A1 | 3/2002 | |
| WO | WO 02/39356 A1 | 5/2002 | |
| WO | WO 02/019069 A | 7/2002 | |

OTHER PUBLICATIONS

Sobell, Mark G., "A Practical Guide to the Unix System," 3rd ed. Copyright 1995, pp. 20, 25, 27, 491-493.*

International Searching Authority, "Notification of transmittal of the international search report and the written opinion of the international searching authority, or the declaration," International Application No. PCT/US05/18569, dated Oct. 17, 2005, 10 pages.

Current claims, PCT/US05/18569, 7 pages.

International Searching Authority, "Notification of transmittal of the international search report and the written opinion of the international searching authority, or the declaration," International Application No. PCT/US05/18570, dated Sep. 11, 2006, 7 pages.

Current claims, PCT/US05/18570, 7 pages.

International Searching Authority, "Notification of transmittal of the international search report and the written opinion of the international searching authority, or the declaration," international application No. PCT/US2005/005498, dated May 18, 2005, 12 pages.

Current Claims, PCT/US2005/005498, 14 pages.

* cited by examiner

METHOD AND APPARATUS FOR PROVIDING TEMPORARY ACCESS TO A NETWORK DEVICE

CROSS-REFERENCE TO RELATED APPLICATIONS PRIORITY CLAIM

This application claims domestic priority under 35 U.S.C. §119(e) from prior U.S. provisional application Ser. No. 60/575,658, entitled "Providing Temporary Access To A Network Device, Using Destination Domain-Based Bounce Profiles, Monitoring The Flow Of Messages From Senders, And Controlling The Flow Of Messages From Senders," filed May 29, 2004, naming Paul J. Clegg, Charlie S. Slater, R. Brian Harrison, Lonhyn Jasinskyj, Ben Cottrell, Eric Huss, Craig Sprosts, Krishna Srinivasan, Peter Schlampp, Shun Chen, Robert Brahms, Daniel Quinlan, and Brennan H. Evans as inventors, the entire disclosure of which is hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent & Trademark Office patent file or records, but otherwise reserves all copyright rights whatsoever. Copyright © 2001-2005 IronPort Systems, Inc.

FIELD OF THE INVENTION

The present invention relates to providing, to another party, temporary access to a network device.

BACKGROUND

Modern network devices typically require service at various points throughout the operational life of the network device. Sometimes the party using the network device (the "user") can perform the required service, while other times, the user lacks the technical expertise to service the network device. A network device may also be intentionally designed so that the user (which may be a customer of the manufacturer or provider of the network device) is unable to perform the required service to prevent the user from modifying the network device. As a result, the network device often requires service by another party besides the user, such as the manufacturer or other provider of the network device or some other qualified support service provider.

A support technician can perform the service on the network device directly, but this requires that the support technician travel to the network device's location, which may be inconvenient in terms of the cost and the travel time required. Another alternative is for the user to send the network device to the support technician, but this approach also may involve significant costs and delays, in addition to the user being unable to use the network device while the network device is away being serviced.

If the network device is connected to a network, such as the Internet, the support technician may attempt to service the network device through the network using a password and an interface that enables the support technician to gain access to resources of the network device. For example, modern network devices typically use a multi-user operating system that supports two or more user accounts. Each user account can access the network device using a set of access privileges assigned to the user account. Typically, the set of user accounts provided by a multi-user operating system includes an administrator account (for example, a root user account in the UNIX operating system) that allows unfettered access to the network device and associated resources. To address most service issues, a support technician logs into the network device using the administrator account by supplying a password assigned to the administrator account.

However, to address security concerns, the passwords used to log into a network device using an administrator account should be safeguarded and periodically changed, which may be burdensome. When multiple network devices each use the same administrator account password, the potential security risk increases because if the password were to become known to a third party, the third party would have unfettered access to multiple network devices. On the other hand, the use of different passwords for administrator accounts on multiple network devices increases the burden of managing the passwords. Finally, the user must trust that the support technician, once given the password to the administrator account for a network device, will not perform actions using the administrator account unrelated to the service to be performed on the network device.

Another problem is that the manufacturer or provider of the network device may wish to prevent the user of the network device from accessing certain resources of the network device. One approach for doing so involves the manufacturer or provider establishing a password for use in accessing resources of a network device prior to the network device leaving the control of the manufacturer or provider. For example, a password for a network device may be established during manufacturing or configuration of the network device. The password may then be provided, as needed, over a network or entered directly at the network device using an input device, such as a keypad.

A problem with the manufacturer or provider establishing a password is that all the passwords for all the network devices produced by the manufacturer or provider must be safeguarded and managed by the manufacturer or provider. Safeguarding such a large number of passwords is cumbersome, especially when a manufacturer outsources the manufacturing of the network device to another company.

Also, such passwords provide exclusive control of the network device to the manufacturer or the support technician, leaving the user of the network device without any way to limit when or by whom the network device is serviced. This may be especially troublesome if the servicing of the network device would interrupt the user's use of the network device at an undesirable time.

Thus, there is a need for the user of a network device to have service performed on the network device by a support service provider that allows the support service provider to access the network device to perform the required service without the user having such access, and yet still enable the user to control when the support service provider may access the network device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

A machine-implemented method for providing access to one or more resources of a network device comprises receiving input from a first user; generating a first password for said resources of said network device based on, at least in part, (a) said input from the first user, and (b) an algorithm, wherein said algorithm is always, during the steps of the method, concealed from said first user, and wherein said first password is always, during the steps of the method, concealed from said first user; receiving a second password from a second user, wherein said second password is generated based on, at least in part, (a) said input from the first user, and (b) said algorithm, wherein said algorithm is known to said second user, and wherein said second password is always, during the steps of the method, concealed from said first user; determining whether said first password matches said second password; and in response to determining that said first password matches said second password, providing said second user with access to said one or more resources of said network device; wherein the first user and the second user are different users in different locations.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Functional Overview

Techniques are described herein for providing temporary access to resources of a network device. In one embodiment, a user may temporarily establish a password that may be used to access resources of a network device, wherein (a) the password is concealed from the user, and (b) the password may be supplied, with the user's consent, to another party for use in accessing the resources of the network device. In this way, the user of the network device (a) maintains control over who may access the resources of the network device and when they may do so, but (b) the user is prevented from gaining access to resources of the network device himself since the password is concealed from the user.

According to one embodiment, the user instructs a network device to generate a password (a "user password") that is concealed from the user of the network device. The network device generates the user password based on, at least in part, data ("public input") that is provided by the user, and an algorithm ("the concealed algorithm") which is concealed from the user, but known to a support service provider. For example, the concealed algorithm may be encoded into the operating system of the network device.

To allow the support service provider to access the network device, the user communicates, to a support service provider, the user's public input. For example, the user may telephone, transmit a facsimile, or email the support service provider to inform the support service provider of the user's public input. The support service provider then uses the user's public input to generate a second password (a "provider password") based on, at least in part, the concealed algorithm (which is known to the support service provider).

The support service provider may be, but need not be, the manufacturer or provider of the network device. If the support service provider is the manufacturer or provider of the network device, the support service provider knows the concealed algorithm because the support service provider chose the concealed algorithm. However, if the support service provider is not the manufacturer or provider of the network device, the manufacturer or provider of the network device can provide a mechanism to the support service provider, such as a software application, that includes the concealed algorithm.

Once the support service provider generates the provider password, the support service provider may then access the network device via a network, such as the Internet, by providing the provider password to the network device. If the provider password matches the user password generated by the network device, then the support service provider may be granted access to resources of the network device, thereby allowing the support service provider to perform the required service on the network device.

In other embodiments, the user can specify a time period during which the user password is valid. After the time period has elapsed, the user password expires. Any provider password that matches an expired user password cannot be used to access the network device. In addition, the user may terminate the user password at any time by a variety of means, such as by generating another user password or by manually resetting or canceling an existing user password. Any provider password that matches a terminated user password also cannot be used to access the network device.

Architecture Overview

Figure 1:
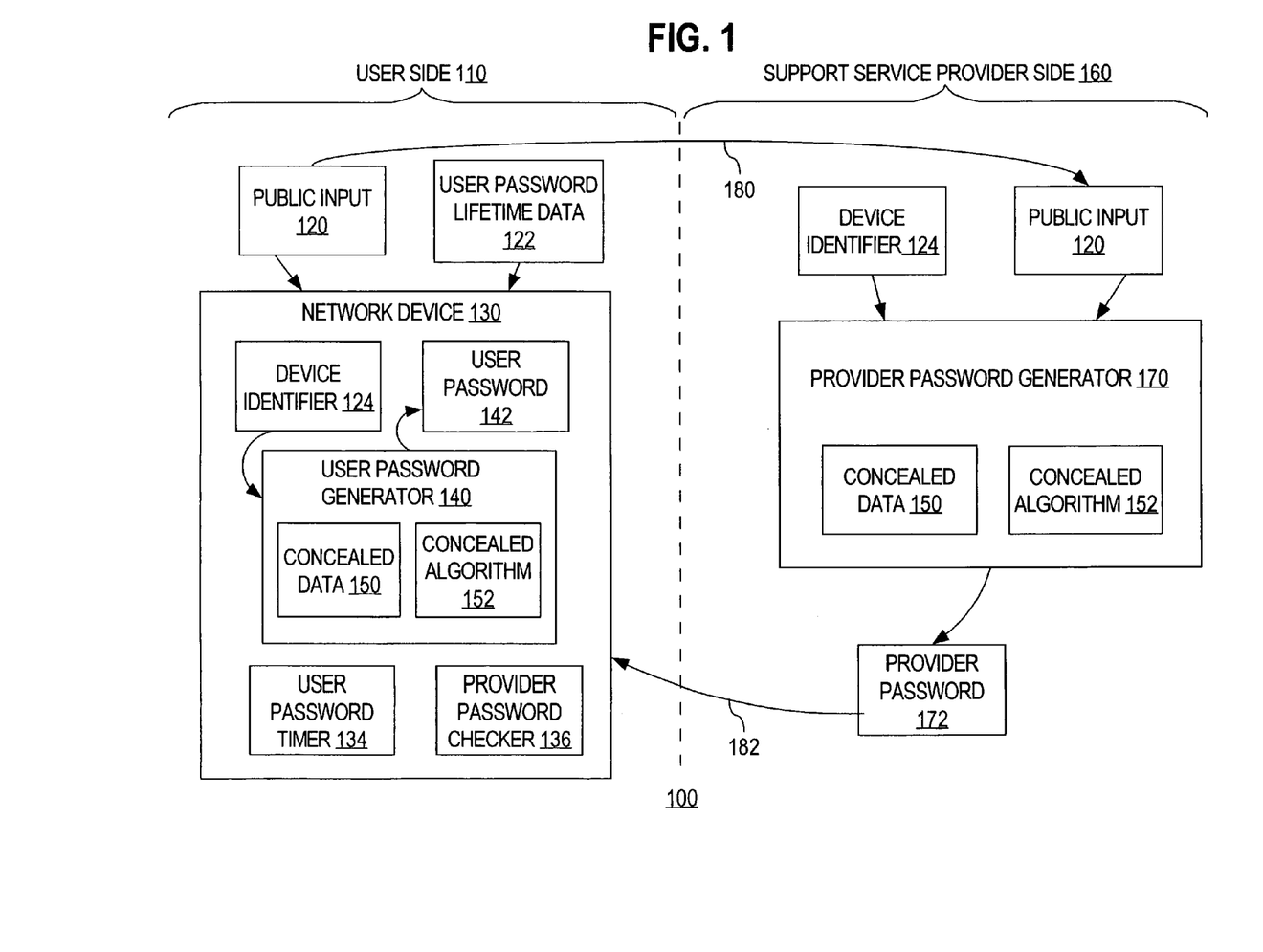
FIG. 1 is a block diagram of a system for providing temporary access to a network device according to an embodiment.

FIG. 1 is a block diagram of a system 100 for providing temporary access to network device 130 according to an embodiment. For purposes of illustrating a clear example, system 100 is divided into user side 110 and service provider side 160.

The term "user" refers herein broadly to any party that uses network device 130. For example, the user may be a customer of a support service provider responsible for servicing network device 130. The user may be a field engineer, sales engineer, sales representative, or other field representative of the support service provider, or a manufacturer of network device 130.

The term "support service provider" refers herein broadly to any party that is responsible for providing service to network device 130. For example, a support service provider may be the company that made or sold network device 130 to the user or a third party that provides support for network device 130. To illustrate, network device 130 may be a mail transfer agent, the support service provider may be a mail transfer agent provider, and the user may be a customer of the mail transfer agent provider.

System 100 on user side 110 includes public input 120, user password lifetime data 122, and network device 130.

Public input 120, as broadly used herein, refers to any data that may be supplied by a user to network device 130 that may be used by the network device, as described below, in generating a user password 142. For example, public input 120 may be a string arbitrarily chosen by the user. Network device 130 may establish rules for determining what constitutes acceptable public input 120; thus, public input 120 may range in complexity from a simple text string (such as a pet name or mother's maiden name) to a complex, nonsensical phrase (such as "fgh2 8GG 43s"). Since the user supplies the public input 120 to the network device 130, the user knows the public input 120.

User password lifetime data 122 refers to data that describes a time period during which a generated user password 142 is valid. When the user supplies the public input 120 to network device 130 for use in generating the user password 142, the user may also provide user password lifetime data 122. User password lifetime data 122 may measure time periods by identifying a specific time (for example, at 1:34 PM EST on May 1, 2006, a user password 142 expires) or by identifying an amount of time (for example, a user password 142 expires after four hours). After the time period identified by the user password lifetime data 122 has expired, the user password 142 is no longer valid. In an embodiment, network device 130 may be configured with a default user password lifetime value. User password lifetime data 122 may be configurable to different values through an appropriate user interface command or graphical user interface.

As shown and described herein, network device 130 broadly represents any device to which a user can provide temporary access. In one embodiment, network device 130 is any of the A-Series and C-Series Messaging Gateway Appliance™ devices that are commercially offered by IronPort Systems, Inc., San Bruno, Calif. In various embodiments, network device 130 is any of a router, switch, gateway, and server. The particular internal configuration and external functions of network device 130 are not critical.

As illustrated in the example of FIG. 1, network device 130 comprises a device identifier 124, a user password generator 140, a user password timer 134, and a provider password checker 136. Additionally, network device 130 may also comprise a generated user password 142 that is concealed from the user.

A device identifier 124 refers data that uniquely identifies the network device 130. For example, in an embodiment, device identifier 124 may be implemented by a serial number of network device 130, media access control (MAC) address, etc.

A user password generator 140 refers to any functional component that can generate a user password 142 based on, at least in part, public input 120 and the concealed algorithm 152. Concealed algorithm 152 is an algorithm that is concealed from the user, but known to the support service provider. The user password 142 generated by the user password generator 140 is concealed from the user by the network device 130. Therefore, once the user password generator 140 generates the user password 142, the network device 130 does not communicate the user password 142 to anyone, including the user.

In an embodiment, the user password generator 140 may also use the device identifier 124 in generating the user password 142, so that the user password 142 is unique to the particular network device 130. Additionally, in an embodiment, the user password generator 140 may also use concealed data 150 in generating the user password 142. Concealed data 150 refers to data that is concealed from the user, but known to the support service provider. In such an embodiment, the concealed data 150 and the concealed algorithm 152 are both concealed from the user, thereby making it harder for the user to ascertain the user password 142 since the user password 142 is generated using two variables that are unknown to the user.

As one example, user password generator 140 can be implemented using a software application or module that is part of the operating system of network device 130, and concealed algorithm 152 and concealed data 150 may be specified in the code for the software application or module. As a result, neither the user nor any other third party can determine either the concealed data 150 or the concealed algorithm 152. However, the entity that created the network device 130 knows both concealed data 150 and the concealed algorithm 152 since that entity also created the operating system for network device 130.

Other methods of concealing the concealed data 150 and concealed algorithm 152 may be used, such as encoding in firmware, hardware, nonvolatile memory, etc. The concealed data 150 and concealed algorithm 152 may be stored in a secure peripheral. Thus, encoding in an operating system by the same entity that manufactured network device 130 is not a requirement.

A user password timer 134 may be implemented by any functional component capable of tracking the amount of time during which the user password 142 is valid based on the user password lifetime data 122. User password timer 134 can be implemented in a number of ways, such as a software module or process of an operating system. For example, user password timer 134 may be implemented using a UNIX "cron" job that executes at regular intervals. Such a cron job checks a stored counter that is decremented by each time the counter is checked. When the value of the counter is zero, the user password 142 is considered expired.

A provider password checker 136 may be implemented by any functional component capable of determining whether a provider password 172, received by network device 130, matches a user password 142 generated by the user password generator 140. If the provider password checker 136 determines that a received provider password 172 matches a valid user password 142 generated by user password generator 140, then provider password checker 136 grants the support service provider access to protected resources of the network device 130 associated with the user password 142. The protected resources may include, for example, an administrator account. The provider password checker 136 communicates with user password timer 134 to determine whether the user password 142 is valid.

If the provider password checker 136 determines that a received provider password 172 does not match a valid user password 142 generated by user password generator 140, then provider password checker 136 denies the support service provider access to the resources of the network device 130 associated with the user password 142.

System 100 on support service provider side 160 includes public input 120, the device identifier 124, the provider password generator 170, and the provider password 172. Provider password generator 170 generates the provider password 172 based on, at least in part, (1) the public input 120 that is transmitted to the support service provider by the user, and (2) the concealed algorithm 152 which is known to the support service provider, but not known by the user. Once the provider password generator 170 generates the provider password 172, a support technician of the support service provider may transmit the provider password 172 to the network device 130 to attempt to gain access to the network device 130.

In an embodiment, the provider password generator 170 may generate the provider password 172 based on, in addition to any other information, the device identifier 124. Additionally, in an embodiment, the provider password generator 170 may generate the provider password 172 based on, in addition to any other information, the concealed data 150, which is known to the support service provider, but not the user. The provider password generator 170 may store the device identifier 124 for the network device 130, or the provider password generator 170 may receive the device identifier 124 from the user. Since the user does not know the concealed algorithm 152 or the concealed data 150, the provider password generator stores the concealed algorithm 152 and the concealed data 150.

In embodiments, the user password generator 140 and the provider password generator 170 may each generate passwords using any technique, as long as the user password generator 140 and the provider password generator 170 employ the same technique, a first portion of the information used to generate the passwords is known to both the user and the support service provider, and a second portion of the information used to generate the passwords is not known to the user, but known to the support service provider. For example, an embodiment may use a technique for generating a password using other information or additional variables other than those discussed above.

The provider password generator 170 may be, but need not be, part of network device 130. For example, as shown in FIG. 1, provider password generator 170 is depicted as a module of another software application or as part of a separate software application, residing at the support service provider side 160, which generates provider password 172. For example, the provider password generator 170 may be implemented as a CGI script hosted at a server on support service provider side 160.

The user may transmit information, such as public input 120 (and optionally the device identifier 124) to the support service provider side 160 over communications link 180. The support service provider may transmit the provider password 172 to the network device 130 over communications link 182. Communications link 180 may be implemented by any medium or mechanism that provides for the user to inform the support service provider with the user's public input 120, e.g., a user may any of the following to communicate the user's public input to the support service provider: a telephone call, an email, postal mail, or oral communication. Communications link 182 may be implemented by any medium or mechanism that provides for the exchange of data between the provider password generator 170 and the network device 130. Examples of communications links 180 and 182 include, without limitation, a network such as a Local Area Network (LAN), Wide Area Network (WAN), Ethernet or the Internet, or one or more terrestrial, satellite or wireless links.

Providing Temporary Access to a Network Device

Figure 2:
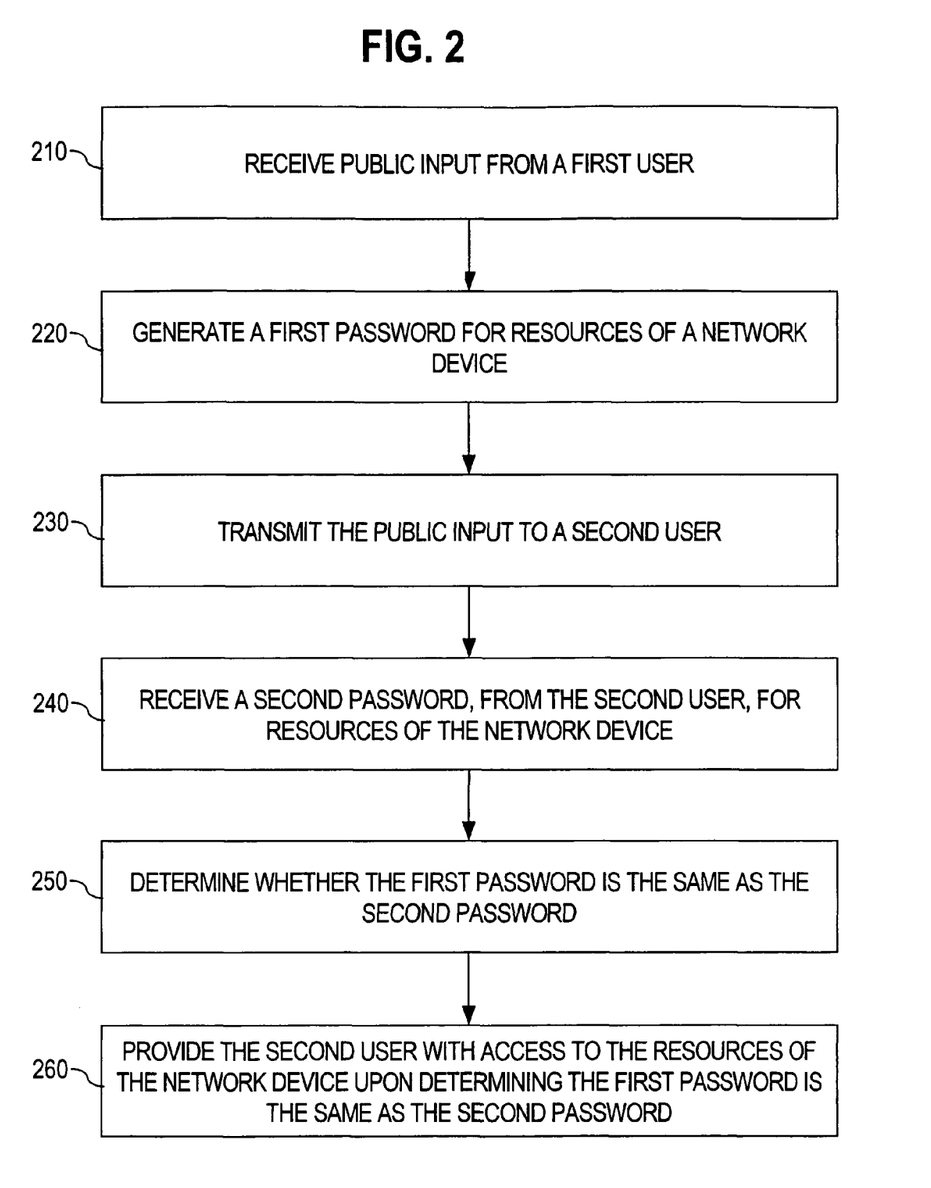
FIG. 2 is a flowchart illustrating the functional steps performed by an embodiment.

FIG. 2 is a flowchart illustrating functional steps performed by an embodiment. For purposes of illustrating a clear example, the process of FIG. 2 is described herein with respect to the context of FIG. 1. However, the broad approach of FIG. 2 may be applied in any other environment, and the specific arrangement of FIG. 1 is not required. Further, for the purposes of describing FIG. 2, assume that network device 130 requires service from support service provider side 160.

Initially, in step 210, network device 130 receives public input 120 from the user. The user may supply the public input 120 to the network device 130 for purposes of generating a user password 142 to be associated with resources of network device 130 which the user requires service upon from the support service provider. In an embodiment, the user may also supply user password lifetime data 122 to the network device 130 contemporaneous with supplying public input 120 to the network device 130 in step 210. In one embodiment, a user provides public input 120 and user password lifetime data 122 using a command of a command-line interface or graphical user interface that network device 130 recognizes. User password generator 140 receives the values.

Since the generation of user password 142 is based on, at least in part, the public input 120 supplied by the user, one or more security features may protect the submission of the public input 120. For example, network device 130 may be configured to require the user to enter a security password in order to supply public input 120 (and optionally the user password lifetime data 122) to network device 130 in step 210.

In some implementations, the user may supply public input 120 (and optionally the user password lifetime data 122) to the network device 130 using a limited-purpose command "shell" that allows the user to do the following:

(1) Quit/exit.
(2) View the system/device serial number of network device 130 or other such device identifier 124.
(3) Perform emergency configuration of a diagnostic network interface that is used by the support service provider to obtain access to network device 130.
(4) Undo emergency configuration of the diagnostic network interface.
(5) Start an emergency secure shell (SSH) daemon on a configurable transport control protocol (TCP) port on the internet protocol (IP) address that is configured on the diagnostic network interface.
(6) Stop the emergency SSH daemon.
(7) If a service backdoor is "on" (that is, the user password 142 has been established for the diagnostic network interface), provide an indication to the user that there is an established and valid user password 142.
(8) If the service backdoor is "on," offer the user the option to disable the user password 142.
(9) If the service backdoor is "off" (that is, there is no currently valid user password 142), offer the user the option to enable the user password 142, including confirming the user's intent to enable the user password 142 and to request for new public input 120 from the user to generate a new user password 142.

Example 1, in Appendix A, presents an example of command-line commands and responses in a login session, using a limited-purpose "shell," to network device 130 in which a user grants a support service provider temporary access to the network device. Alternatively, the same functions may be provided using a graphical user interface that network device 130 generates.

After the network device 130 receives the public input 120 from the user, processing proceeds to step 220. In step 220, the user password 142 for resources of network device 130 is generated by network device 130. The user password generator 140 generates the user password 142 in step 220 based on, at least in part, the public input 120 using the concealed algorithm 152. As explained above, the user password generator 140 may also generate the user password 142 based on other information, such as the device identifier 124 or concealed data 150.

The user password 142 may be supplied, with the user's consent, to another party for use in accessing the resources of the network device. In this way, the user of the network device (a) maintains control over who may access the resources of the network device 130 and when they may do so, but (b) the user is prevented from gaining access to resources of the network device 130 himself since the user password 142 is concealed from the user.

After the user password 142 is generated, processing proceeds to step 230. In step 230, the public input 120 is transmitted to the support service provider. The user may transmit the public input 120 to the support service provider by a variety of methods. For example, the user may telephone, transmit a facsimile, use an interface (such as a command line interface) provided by network device 130, or email the support service provider to inform the support service provider of the user's public input 120.

In an embodiment, in step 230, in addition to transmitting the public input 120, the user also transmits device identifier 124 to the support service provider. In an embodiment, the support service provider stores the device identifier 124.

Step 230 may be performed any time after the public input 120 is established by the user. For example, step 230 may be performed contemporaneous with step 210 or prior to step 220. Thus, the performance of step 230 may be preformed anytime before the performance of step 240.

In step 240, network device 130 receives a provider password 172 from the support service provider. In an embodiment, provider password generator 170 generates provider password 172 based on, at least in part, the public input 120 transmitted to the support service provider in step 230. A support technician of the support service provider may thereafter transmit the provider password 172 over communications link 182 to the network device 130 to attempt to gain access to the resources of network device 130 that require servicing.

Provider password generator 170 comprises concealed algorithm 152, which is the same algorithm as the concealed algorithm 152 used by the user password generator 140 to generate the user password 142. In an embodiment where user password generator 140 generates the user password 142 using concealed data 150, the concealed data 150 used by the user password generator 140 to generate the user password 142 is the same data as the concealed data 150 used by the provider password generator 170 in generating the provider password 172.

Unlike user password generator 140, which stores user password 142 and does not disclose user password 142 outside of network device 130, the provider password 172, generated by provider password generator 170, is disclosed to the support service provider for use in accessing network device 130 via communications link 182. For example, a support technician working for support service provider may use provider password generator 170 to generate provider password 172, and attempt to connect to network device 130 by transmitting the provider password 172 to the network device 130 over communications link 182. After the network device 130 receives the provider password 172, processing proceeds to step 250.

In step 250, the network device 130 determines whether the user password 142 generated by the network device 130 matches the provider password 172 received by the network device 130 in step 240. In an embodiment, provider password checker 136 compares the user password 142 with the provider password 172 to determine if they match.

If the provider password checker 136 determines that the provider password 172 matches the user password 142, and if user password timer 134 determines that the user password 142 is valid, then the support service provider will be allowed access to the resources of network device 130 over communications link 182. However, if either provider password 172 does not match user password 142 or if the user password 142 has expired (i.e., the user password is not valid), then the support service provider will not be allowed to access to the resources of network device 130. After the determination of step 250 is performed, processing proceeds to step 260.

In step 260, upon determining that the user password 142 matches the provider password 172, and that the user password 142 is valid, the network device 130 provides the support service provider with access to the resources of the network device 130 over communications link 182.

Using the approach illustrated in FIG. 2, the user of network device 130 is able to grant support service provider access to the resources of network device 130 which require servicing for a limited period of time. However, because the user cannot determine the user password 142, the user himself cannot access the resources of network device 130 that are protected by user password 142.

The fact that the user password 142 is concealed from the user will not hinder the use of network device 130 by the user as many types of network devices, such as network device 130, are designed such that the users or customers who use or purchase the network device are unable to access certain aspects of the network device. However, such users or customers often do not desire that a support service provider has unfettered access to such resources of the network device without restraint since there are periods during which the support activities performed on the network device may impact the functioning of the network device at a time or in a manner that the user would like to avoid. Thus, following the approach of FIG. 2, a user may grant a support technician from a support service provider access to those protected resources of the network device over times when the user is less concerned about the support activities impacting the main purpose of the network device, such as during a weekend or the evening.

Further, as an example, this approach enables a vendor of a network device, which includes vendor trade secrets or other protected resources yet is owned by a customer, to access the protected resources only when the customer's user grants access, and only for a limited time period. This approach gives the customer control over when to grant a vendor access to the customer's property, yet ensures that the customer cannot access internal resources that the vendor considers proprietary.

The security afforded by the approach illustrated in FIG. 2 benefits from keeping the concealed algorithm 152 and the concealed data 150 concealed from everyone except authorized personnel associated with the support service provider. Furthermore, the support service provider may change or update the concealed algorithm 152 and/or the concealed data 150 as part of software updates to the network device 130 on a periodic or as needed basis to make it less likely that an unauthorized person will learn or discover the concealed algorithm 152 and/or the concealed data 150.

However, even if the concealed algorithm 152, the concealed data 150, and/or the device identifier 124 are learned or discovered by an unauthorized individual who is able to generate the corresponding provider password 172, the unauthorized individual will not be able to access the network device until the user establishes a user password 142 for the network device 130, and the unauthorized individual learns the public input 120 used in generating the user password 142. As described above, the user typically must successfully negotiate one or more security features, such as a password known only to the user, to be able to supply the public input 120 (and optionally the user password lifetime data 122) to the network device 130.

Thus, in the unlikely event that the concealed algorithm 152, the concealed data 150, and/or the device identifier 124 are learned or discovered by an unauthorized individual, the unauthorized individual must still overcome another level of security to gain access to the network device 130. Further, the user can either revoke an existing user password 142 or generate a new user password 142 to prevent unauthorized access to the network device 130 by the unauthorized individual if the unauthorized individual discovers either the public input 120 or the user password 142.

Because the concealed algorithm 152, the concealed data 150 are not known outside of the support service provider, the need to protect the public input 120 provided by the user is less because knowledge of only the public input 120 does not allow access to the network device.

The optional use of a device identifier 124 or other information (such as the concealed data 150) in generating the user password 142 increases the security of the network device 130 by making it more difficult to break the concealed algorithm 152 by trial and error. In addition, use of the device identifier 124 in generating the user password 142 results in a user password 142 that is unique to the network device 130 associated with the device identifier 124. Thus, if a user or customer has several network devices and the user selects the same public input 120 to generate user passwords for each network device, the resulting user passwords are different for each network device because the device identifier for each network device is different. As a result, the user can selectively grant access to the support service provider on a specific set of network devices (such as one or more, but not all, of the user's network devices), because each user password only grants access to the corresponding network device.

Additional features may be incorporated in the approaches described herein. For example, in an embodiment, the network device is configured to track or manage past user passwords or public inputs to ensure that old public inputs are not reused, or at least not reused within a certain period or number of settings of the corresponding user password.

In another embodiment, system 100 is configured to check the public input 120 against a set of passwords used by the user to access resources of system 100 to ensure that the public input 120 is not the same or similar to other public inputs or passwords supplied by or used by the user.

In another embodiment, the expiration of a user password or the manual termination by the user of a user password may or may not affect a currently open connection based on the user password, depending on the configuration of the network device 130.

Implementing the Concealed Algorithm

In one illustrative embodiment, the concealed algorithm 152 is implemented by using the first 8 characters of a one-way hash of the concatenation of the public input 120, the device identifier 124, and the concealed data 150. The one-way hash may be produced using the MD5 hash function, SHA-1, or any other one-way hash function. The public input 120 and the device identifier 124 may be trimmed of all leading and trailing white space before being combined. The public input 120 may sent to a support technician, or another person at the support provider, by a variety of ways, such as over the phone, sent via snail mail, sent via email, etc.

In an embodiment, the device identifier 124 is the serial number of the network device 130. For example, the device identifier 124 may comprise the entire serial number of the network device 130, including any trailing zeroes. Additionally, prior to generating a user password 142 or a provider password 172, the device identifier 124 or the public input 120 may be converted to all uppercase letters or all lowercase letters. In other implementations, the concealed algorithm 152 may be implemented using other algorithms besides a hash of the concatenation of the public input 120, the device identifier 124, and the concealed data 150.

Generally speaking, concealed data 150 should not be written down in any document, nor should the concealed data 150 appear as a clear, contiguous text string in the source code, to prevent the concealed data 150 from becoming known to the user.

Embodiments of the invention recognize that when a user of network device 130 transmits the public input 120 to a support service provider in step 230, the user may be distracted or stressed because the user perceives a problem in the operation of network device 130 which the user wishes the support service provider to address. For example, if the user is dictating to the support service provider their public input 120, the public input 120 may be hastily written down (and thus contain an error), or the user may, in reading the public input 120, verbalize the number "0" instead of the letter "o," or vice-versa. Embodiments may use a function to account for reasonable user mistakes in transmitting the public input 120 to the support service provider in step 230.

For example, the following pseudocode formula may be used to generate a user password or a provider password:

password=first 8 characters(MD5(fuzzify(trim(public input 120))+trim(lowercase(serial number))+ concealed data 150))

As the above example illustrates, the public input 120 is trimmed of all leading and trailing white space, the serial number is converted to a lowercase and is trimmed of all leading and trailing white space. Further, the combined values of the public input 120, the serial number, and the concealed data 150 are evaluated using the function "fuzzify" (which may be any function) which accounts for reasonable user error in transmitting the public input 120 to the support service provider. For example, the fuzzify function may treat the letter "l" the same as the number "1" because they look similar, and a user may easily confuse one for the other when transmitting the public input 120 to the second user in step 230. In this way, if the user makes a reasonable mistake in transmitting the public input 120 to the support service provider because the user is stressed or flustered, the generated user password 142 and the provider password 172 will be the same, and thereby allow the support service provider to perform the requested service on network device 130.

Implementing Mechanisms

In an embodiment, network device 130 may be implemented using an email gateway device. An email gateway device acts as (a) a gateway between networks and (b) a mail server for sending and receiving email messages. Illustrative, non-limiting examples of an email gateway device include the IronPort A-Series Messaging Gateway Appliances and C-Series Messaging Gateway Appliances produced by IronPort Systems, Inc., of San Bruno, Calif.

The IronPort A-Series family of email gateway devices includes two messaging gateway devices, the A30 and A60, both of which provide high performance email delivery to a large number of recipients, which may be used for commercial email delivery of transaction confirmations or customer newsletters. The A30 can deliver at least 600,000 email messages per hour, and the A60 can deliver at least 1,000,000 messages per hour, both of which are much greater than can be achieved by traditional open-source mail transport agents (MTAs), such as general-purpose servers running sendmail or qmail. Messaging gateway appliances such as the IronPort A-Series family are sometimes referred to as "injectors" because such mail gateway appliances inject messages into another messaging gateway appliances, such as by sending email through the Internet from a sender that is associated with one messaging gateway appliance to a recipient that is associated with another messaging gateway appliance.

The IronPort C-Series family includes three email security appliances, the C10, C30 and C60, which provide threat protection, block spam and viruses, and enable corporate email policy enforcement. The email security appliances in the C-Series family are deployed between an organization's firewall and groupware servers, such as Exchange™, Notes™, and GroupWise™, to power and protect email flowing in from or out to the Internet.

The different A-Series and C-Series appliances include one or both of the following non-IronPort technologies: the Sophos™ anti-virus technology and the Brightmail™ anti-spam technology.

The C-Series appliances and optionally the A60 appliance include the Sophos™ anti-virus technology. Sophos employs multiple techniques to detect and clean all major forms of viruses, including advanced emulation technology to detect polymorphic viruses and an on-line decompressor for scanning multi-layer attachments. Administrators can take any of several actions to handle messages that are identified as being infection by Sophos. For example, actions include cleaning the message, dropping the attachment, modifying the subject header, deleting the entire infected message, sending an optional notification, or a combination of these actions. The Sophos engine shares information with the IronPort C-Series Mail Flow Monitor to provide real-time and historical reports. During a virus outbreak, the period from the start of the outbreak until an anti-virus identify file is deployed can be covered by IronPort's content scanning technology to identify viruses based on known patterns, or messages can be deleted or archived until new identity files are updated.

The C-Series IronPort appliances include the Brightmail™ anti-spam technology, which is optimized to work with IronPort's AsyncOS™. Brightmail uses real-time methods to identify spam through Brightmail's Probe Network™ and generates approximately 30,000 new rules a day. Automatic rule updates are used, with rules automatically downloaded from the Brightmail servers typically every ten minutes to provide real-time protection. Administrators can take any of several actions to handle messages that are flagged as spam by Brightmail. The actions include sending the messages to a per-recipient web quarantine, marking up the subject header, adding an additional "X-header," sending the message to an alternate folder in the user's mailbox, deleting or bouncing the message, or a combination of these actions. The Brightmail system shares information with the IronPort C-Series Mail Flow Monitor to provide real-time and historical reports that are available at any time.

Figure 3:
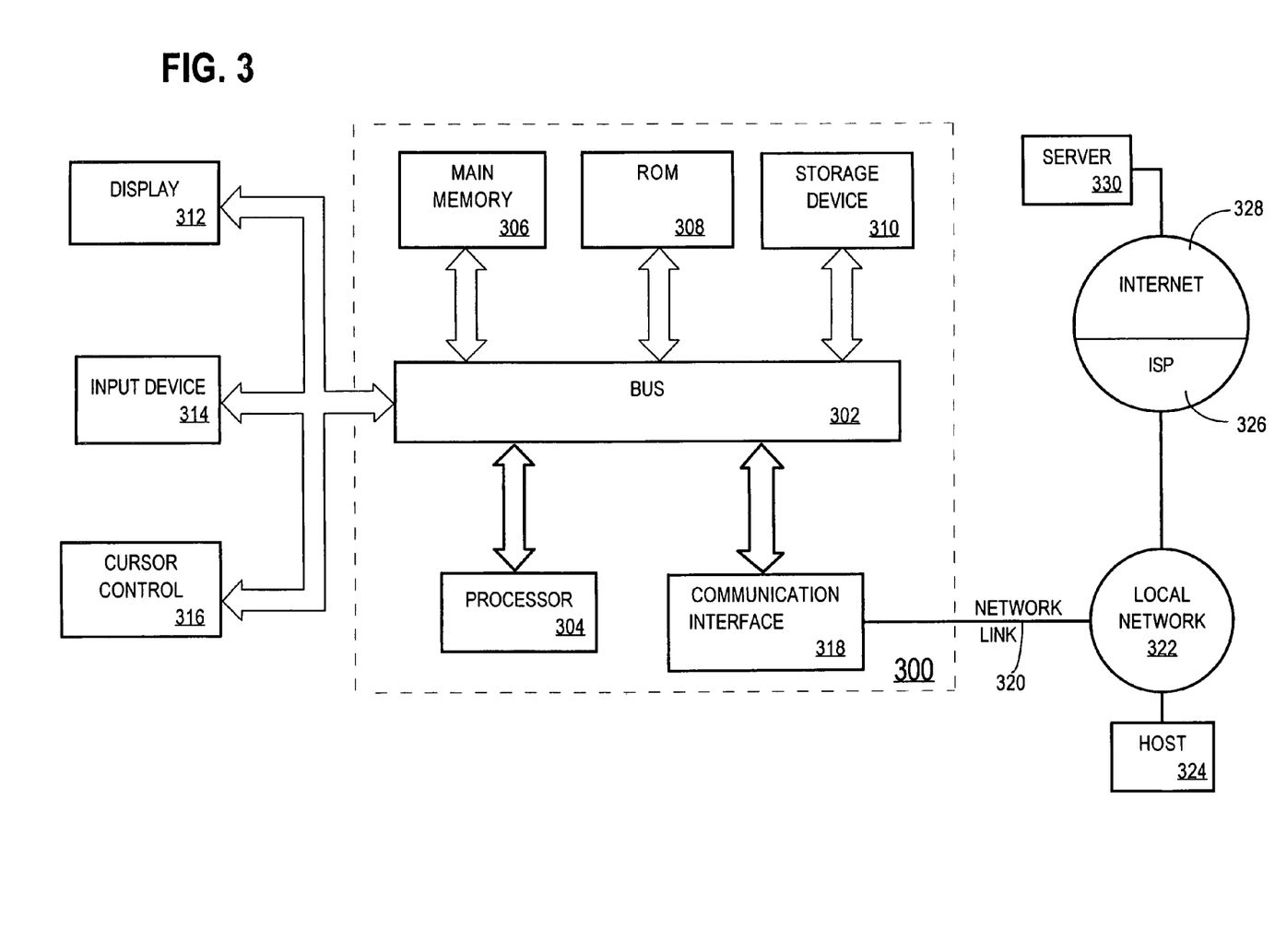
FIG. 3 is a block diagram that illustrates a computer system upon which an embodiment may be implemented.

In another embodiment, network device 130 may be implemented using a general-purpose computer system that is programmed to perform the functions described herein. FIG. 3 is a block diagram that illustrates a computer system 300 upon which an embodiment may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the claims that issue, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX A

Example 1 is an illustrative example of a login session to network device 130 in which a user grants a support service provider temporary access to network device 130.

EXAMPLE 1 sh-2.05a$ ssh enablediag@somephoebe
enablediag@somephoebe's password:
Last login: Thu MONTH 5 20:06:19 from someclient
Copyright (c) xxxx-yyyy, IronPort Systems, Inc.
AsyncOS 3.0 for IronPort A60
Welcome to the IronPort A60 Messaging Gateway Appliance(™)
S/N 000347AD6BE4-0000000
Service Access currently disabled.
gator.ironport.com>help
Available Commands:
help—view this text
service—Enable or disable access to the service system.
quit—logout
network—Perform emergency configuration of the diagnostic network interface.
clearnet—Resets configuration of the diagnostic network interface.
ssh—Configure emergency SSH daemon on the diagnostic network interface.
clearssh—Stop emergency SSH daemon on the diagnostic network interface.
S/N 000347AD6BE4-0000000
Service Access currently disabled.
gator.ironport.com>service
Service Access is currently disabled. Enabling this system will allow an IronPort customer service representative to remotely access your system to assist you in solving your technical issues. Are you sure you want to do this? [Y/N]>Y
Enter a temporary password for customer care to use. This password may not be the same as your admin password. This password will not be able to be used to directly access your system.
[ ]>sameasmyadminpassword
Illegal password—may not be the same as your admin password.
Enter a temporary password for customer care to use. This password may not be the same as your admin password. This password will not be able to be used to directly access your system.
[ ]>flurble
Service access has been ENABLED. Please provide your temporary password to your IronPort Customer Care representative.
S/N 000347AD6BE4-0000000
Service Access currently ENABLED (0 current service logins)
gator.ironport.com>ssh
I am not able to determine which IP address to start up the emergency SSH daemon on. Please configure your diagnostic network interface with the "network" command, and then re-run the "ssh" command.
S/N 00065B3F0A22-DHBPK11
Service Access currently ENABLED (0 current service logins)
gator.ironport.com>network
IP address>wheee!
invalid input; a dotted quad is required.
IP address>172.16.0.16

Netmask>255.255.255.0
Gateway IP address>172.16.0.1
Would you like to configure an SSH daemon on the diagnostic interface at this time? y
The following TCP ports on 172.16.0.96 are currently in use:
 8123
 2222
Please enter the port on which you would like to start up the emergency SSH daemon.
[ ]>22
About to start emergency SSH daemon on 172.16.0.96 port 22.
Proceed? y
Commit changes made to network settings? y
Network settings for the diagnostic network interface have been changed.
S/N 00065B3F0A22-DHBPK11
Service Access currently ENABLED (0 current service logins)
gator.ironport.com>ssh
The emergency SSH daemon seems to already be running. Would you like to shut it down and change its parameters? n aborted.
S/N 00065B3F0A22-DHBPK11
Service Access currently ENABLED (0 current service logins)
gator.ironport.com>clearssh
Would you like to shut down the emergency SSH daemon? n aborted.
S/N 00065B3F0A22-DHBPK11
Service Access currently ENABLED (0 current service logins)
gator.ironport.com>cleamet
In addition to resetting the configuration of the diagnostic network interface, it is recommended that you also shut down the emergency SSH daemon running on this interface.
You will have a chance to confirm again before any actions are taken.
Do you wish to shut down the emergency SSH daemon when the diagnostic network interface is reset? y
Are you sure you want to reset the configuration of the diagnostic network interface and shut down the emergency SSH daemon? y interfaces are reset.
S/N 00065B3F0A22-DHBPK11
Service Access currently ENABLED (0 current service logins)
gator.ironport.com>clearssh
The emergency SSH daemon does not appear to be running.
S/N 00065B3F0A22-DHBPK11
Service Access currently ENABLED (0 current service logins)
gator.ironport.com>service
Service Access is currently enabled. Disabling this system will prevent IronPort customer service representatives from remotely accessing your system. Are you sure you want to do this? [Y/N]>Y
S/N 000347AD6BE4-0000000
Service Access currently disabled
gator.ironport.com>quit

What is claimed is:

1. A machine-implemented method for providing access to one or more resources of a network device, the method comprising:
 receiving input from a first user, wherein the input is shared with a second user;
 generating a first password for said resources of said network device based at least in part on (a) said input from the first user, and (b) an algorithm, wherein said algorithm is always, during the steps of the method, concealed from said first user, and wherein said first password is always, during the steps of the method, concealed from said first user;
 receiving a second password from the second user, wherein said second password is generated based at least in part on (a) said input from the first user, and (b) said algorithm, wherein said algorithm is known to said second user, and wherein said second password is always, during the steps of the method, concealed from said first user;
 determining whether said first password matches said second password; and
 in response to determining that said first password matches said second password, providing said second user with access to said one or more resources of said network device;
 wherein the first user and the second user are different users in different locations;
 wherein the method is performed by one or more computing devices.

2. The method of claim 1, wherein the generation of said first password and the generation of said second password are both based, at least in part, on (a) a set of data concealed from said first user but known to said second user, or (b) an identifier that uniquely identifies said network device.

3. The method of claim 1, further comprising:
 receiving, from said first user, validity data that identifies a period of time in which said first password is valid, and
 wherein said step of determining whether said first password matches said second password comprises:
  determining whether said period of time has expired; and
  in response to determining that said period of time has expired, preventing said second user from obtaining access to said one or more resources of said network device.

4. The method of claim 1, further comprising:
 receiving a request, from said first user, to perform one action selected from the group comprising (a) generating a new password for said resources of said network device and (b) resetting or canceling said first password.

5. The method of claim 4, further comprising:
 in response to said first user performing said action, preventing said second user from obtaining access to said one or more resources of said network device using a password that matches said first password.

6. The method of claim 1, further comprising:
 transmitting, from said first user to said second user, said input and an identifier that uniquely identifies said network device.

7. The method of claim 1, further comprising:
 maintaining a list of passwords previously generated for said resources of said network device; and
 comparing said first password against said list of passwords to determine if said first password has been previously generated.

8. The method of claim 1, further comprising:
 comparing said input to a password of said first user to ensure that said input is not similar to said password of said first user.

9. The method of claim 1, further comprising:
upon expiration of said first password, revoking access to an open connection provided to a user that supplied a password that matched said first password.

10. A storage device storing one or more sequences of instructions for providing access to resources of a network device, wherein execution of the one or more sequences of instructions by one or more processors causes the one or more processors to perform the steps of:
receiving input from a first user, wherein the input is shared with a second user;
generating a first password for said resources of said network device based at least in part on (a) said input from the first user, and (b) an algorithm, wherein said algorithm is always, during said steps, concealed from said first user, and wherein said first password is always, during said steps, concealed from said first user;
receiving a second password from the second user, wherein said second password is generated based at least in part on (a) said input from the first user, and (b) said algorithm, wherein said algorithm is known to said second user, and wherein said second password is always, during said steps, concealed from said first user;
determining whether said first password matches said second password; and
in response to determining that said first password matches said second password, providing said second user with access to said one or more resources of said network device;
wherein the first user and the second user are different users in different locations.

11. The storage device of claim 10, wherein the generation of said first password and the generation of said second password are both based, at least in part, on (a) a set of data concealed from said first user but known to said second user, or (b) an identifier that uniquely identifies said network device.

12. The storage device of claim 10, wherein execution of the one or more sequences of instructions by the one or more processors further causes the one or more processors to perform the steps of:
receiving, from said first user, validity data that identifies a period of time in which said first password is valid, and wherein said step of determining whether said first password matches said second password comprises:
determining whether said period of time has expired; and
in response to determining that said period of time has expired, preventing said second user from obtaining access to said one or more resources of said network device.

13. The storage device of claim 10, wherein execution of the one or more sequences of instructions by the one or more processors further causes the one or more processors to perform the step of:
receiving a request, from said first user, to perform one action selected from the group comprising (a) generating a new password for said resources of said network device and (b) resetting or canceling said first password.

14. The storage device of claim 13, wherein execution of the one or more sequences of instructions by the one or more processors further causes the one or more processors to perform the step of:
in response to said first user performing said action, preventing said second user from obtaining access to said one or more resources of said network device using a password that matches said first password.

15. The storage device of claim 10, wherein execution of the one or more sequences of instructions by the one or more processors further causes the one or more processors to perform the step of:
transmitting, from said first user to said second user, said input and an identifier that uniquely identifies said network device.

16. The storage device claim 10, wherein execution of the one or more sequences of instructions by the one or more processors further causes the one or more processors to perform the steps of:
maintaining a list of passwords previously generated for said resources of said network device; and
comparing said first password against said list of passwords to determine if said first password has been previously generated.

17. The storage device of claim 10, wherein execution of the one or more sequences of instructions by the one or more processors further causes the one or more processors to perform the step of:
comparing said input to a password of said first user to ensure that said input is not similar to said password of said first user.

18. The storage device of claim 10, wherein execution of the one or more sequences of instructions by the one or more processors further causes the one or more processors to perform the step of:
upon expiration of said first password, revoking access to an open connection provided to a user that supplied a password that matched said first password.

19. An apparatus comprising:
one or more processors; and
a memory coupled to the one or more processors, the memory containing one or more sequences of instructions for providing access to one or more resources of a network device, wherein execution of the one or more sequences of instructions by the one or more processors causes the one or more processors to perform the steps of:
receiving input from a first user, wherein the input is shared with a second user;
generating a first password for said resources of said network device based at least in part on (a) said input from the first user, and (b) an algorithm, wherein said algorithm is always, during said steps, concealed from said first user, and wherein said first password is always, during said steps, concealed from said first user;
receiving a second password from the second user, wherein said second password is generated based at least in part on (a) said input from the first user, and (b) said algorithm, wherein said algorithm is known to said second user, and wherein said second password is always, during said steps, concealed from said first user;
determining whether said first password matches said second password; and
in response to determining that said first password matches said second password, providing said second user with access to said one or more resources of said network device;
wherein the first user and the second user are different users in different locations.

20. The apparatus of claim 19, wherein the generation of said first password and the generation of said second password are both based, at least in part, on (a) a set of data concealed from said first user but known to said second user, or (b) an identifier that uniquely identifies said network device.

21. The apparatus of claim 19, wherein execution of the one or more sequences of instructions by the one or more processors further causes the one or more processors to perform the steps of:
receiving, from said first user, validity data that identifies a period of time in which said first password is valid, and wherein said step of determining whether said first password matches said second password comprises:
determining whether said period of time has expired; and
in response to determining that said period of time has expired, preventing said second user from obtaining access to said one or more resources of said network device.

22. The apparatus of claim 19, wherein execution of the one or more sequences of instructions by the one or more processors further causes the one or more processors to perform the step of:
receiving a request, from said first user, to perform one action selected from the group comprising (a) generating a new password for said resources of said network device and (b) resetting or canceling said first password.

23. The apparatus of claim 22, wherein execution of the one or more sequences of instructions by the one or more processors further causes the one or more processors to perform the step of:
in response to said first user performing said action, preventing said second user from obtaining access to said one or more resources of said network device using a password that matches said first password.

24. The apparatus of claim 19, further comprising:
transmitting, from said first user to said second user, said input and an identifier that uniquely identifies said network device.

25. The apparatus of claim 19, wherein execution of the one or more sequences of instructions by the one or more processors further causes the one or more processors to perform the steps of:
maintaining a list of passwords previously generated for said resources of said network device; and
comparing said first password against said list of passwords to determine if said first password has been previously generated.

26. The apparatus of claim 19, wherein execution of the one or more sequences of instructions by the one or more processors further causes the one or more processors to perform the step of:
comparing said input to a password of said first user to ensure that said input is not similar to said password of said first user.

27. The apparatus of claim 19, wherein execution of the one or more sequences of instructions by the one or more processors further causes the one or more processors to perform the step of:
upon expiration of said first password, revoking access to an open connection provided to a user that supplied a password that matched said first password.

* * * * *